(12) United States Patent
Abdelsamie et al.

(10) Patent No.: US 9,081,417 B2
(45) Date of Patent: Jul. 14, 2015

(54) METHOD AND DEVICE FOR IDENTIFYING CONTACTLESS GESTURES

(71) Applicant: Research In Motion Limited, Waterloo (CA)

(72) Inventors: Ahmed Abdelsamie, Nepean (CA); Omar George Joseph Barake, Waterloo (CA); Jeff Chi Shing Chan, Kingston (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 137 days.

(21) Appl. No.: 13/689,848

(22) Filed: Nov. 30, 2012

(65) Prior Publication Data

US 2014/0152537 A1     Jun. 5, 2014

(51) Int. Cl.
    *G06F 3/01*     (2006.01)
(52) U.S. Cl.
    CPC ...................................... *G06F 3/017* (2013.01)
(58) Field of Classification Search
    None
    See application file for complete search history.

(56) References Cited

U.S. PATENT DOCUMENTS

| | | | | |
|---|---|---|---|---|
| 7,777,899 B1* | 8/2010 | Hildreth | ......................... | 356/614 |
| 2004/0096087 A1* | 5/2004 | Funahashi | ..................... | 382/124 |
| 2006/0133362 A1* | 6/2006 | Stein et al. | ..................... | 370/360 |
| 2008/0205701 A1* | 8/2008 | Shamaie et al. | ............. | 382/103 |
| 2010/0081382 A1* | 4/2010 | Nagashima | .................. | 455/41.2 |
| 2010/0277696 A1 | 11/2010 | Huebner | | |
| 2010/0289752 A1* | 11/2010 | Birkler | ......................... | 345/173 |
| 2010/0295772 A1 | 11/2010 | Alameh et al. | | |
| 2010/0295773 A1* | 11/2010 | Alameh et al. | ................. | 345/156 |
| 2010/0299642 A1 | 11/2010 | Merrell et al. | | |
| 2011/0102438 A1* | 5/2011 | Mathe et al. | ................... | 345/426 |
| 2011/0154390 A1* | 6/2011 | Smith | ............................. | 725/32 |
| 2011/0205191 A1* | 8/2011 | Hou et al. | ...................... | 345/179 |
| 2011/0254864 A1* | 10/2011 | Tsuchikawa et al. | ......... | 345/660 |
| 2011/0310005 A1* | 12/2011 | Chen et al. | ..................... | 345/156 |
| 2012/0174043 A1* | 7/2012 | Queru | .......................... | 715/863 |
| 2012/0192117 A1* | 7/2012 | Migos et al. | .................. | 715/863 |

(Continued)

OTHER PUBLICATIONS

Global Sources EE Times Asia; Photodiode addition lets LCD detect hand gesture. Dec. 23, 2009.

(Continued)

*Primary Examiner* — Seokyun Moon
*Assistant Examiner* — Josemarie G Acha, III
(74) *Attorney, Agent, or Firm* — Rowand LLP

(57) ABSTRACT

Methods and devices for identifying contactless gestures are described. In one example, the present disclosure describes a method of detecting a contactless gesture on an electronic device. The electronic device has an electromagnetic radiation transmitter and an electromagnetic radiation receiver. The electromagnetic radiation receiver is configured for receiving electromagnetic radiation emitted from the electromagnetic radiation transmitter and reflected by an object. The method includes: monitoring an amplitude of received electromagnetic radiation at the electromagnetic radiation receiver; detecting a proximity event by comparing the amplitude to a predetermined proximity threshold; after detecting the proximity event, continuing to monitor the amplitude of the received electromagnetic radiation at the electromagnetic radiation receiver; and, in response to detecting the proximity event, performing an analysis on the received electromagnetic radiation to determine whether the received electromagnetic radiation indicates a predetermined gesture.

20 Claims, 8 Drawing Sheets

(56) References Cited

U.S. PATENT DOCUMENTS

2012/0236973 A1* 9/2012 Raman et al. ............... 375/342
2013/0298026 A1* 11/2013 Fitzpatrick ................. 715/723

OTHER PUBLICATIONS

JDSU—Optical 3D Gesture Recognition and JDSU; http://www.jdsu.com/en-us/Custom-Optics/applications/gesture-recognition/Pages/optical. May 12, 2011.
EPO, Extended European Search Report relating to application No. 12154850.7 dated Jun. 21, 2012.
U.S. Appl. No. 13/370,608, filed Feb. 10, 2012.
Extended European Search Report dated Jun. 11, 2013.

* cited by examiner

METHOD AND DEVICE FOR IDENTIFYING CONTACTLESS GESTURES

TECHNICAL FIELD

The present disclosure relates to input modules for electronic devices and, more particularly, to methods and devices for receiving reflectance-based input and identifying reflectance-based gestures.

BACKGROUND

Electronic devices are often equipped with one or more input devices for receiving instructions, commands, and other input from users of such electronic devices. For example, electronic devices often have one or more depressible buttons or keys which may be activated by a user to input instructions, commands, and other input to the electronic device. Such input devices may include a track pad, trackball, or touch pad, which may be used for providing navigational input to the electronic device. Recently, touchscreen display screens have become commonplace. Touchscreen displays are displays which have a touch-sensitive overlay for receiving input.

While input devices for electronic devices are available in many different shapes and sizes, such input devices often require a user to engage a specific portion of an electronic device (such as a button) through direct contact with that portion (e.g. by pressing a button). Such contact may soil the electronic device. For example, touchscreen displays sometimes become obscured from fingerprints which are left on the display following user contact. In addition to attracting dirt and debris, repeated contact on mechanically activated input devices may result in failure of such input devices over time (e.g. repeated pressing of a button may result in failure of that button).

Contactless input mechanisms have been proposed but techniques for interpreting contactless gestures are typically resource intensive, requiring a large amount of processing capabilities.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
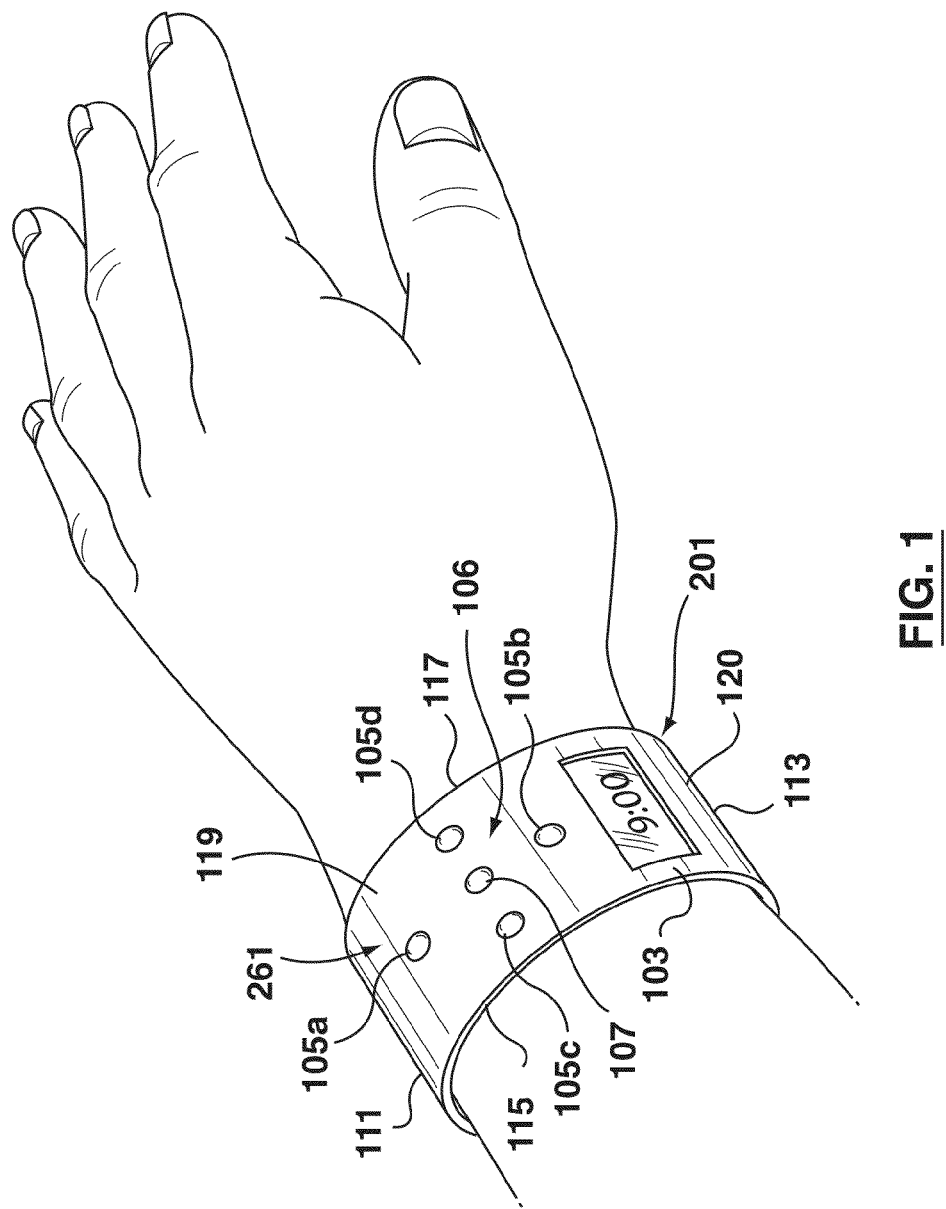
FIG. 1 is a perspective view of an example peripheral device configured to receive contactless gestures in accordance with example embodiments of the present disclosure.

In one aspect, the present disclosure describes a method of detecting a contactless gesture on an electronic device. The electronic device has an electromagnetic radiation transmitter and an electromagnetic radiation receiver. The electromagnetic radiation receiver is configured for receiving electromagnetic radiation emitted from the electromagnetic radiation transmitter and reflected by an object. The method includes: monitoring an amplitude of received electromagnetic radiation at the electromagnetic radiation receiver; detecting a proximity event by comparing the amplitude to a predetermined proximity threshold; after detecting the proximity event, continuing to monitor the amplitude of the received electromagnetic radiation at the electromagnetic radiation receiver; and, in response to detecting the proximity event, performing an analysis on the received electromagnetic radiation to determine whether the received electromagnetic radiation indicates a predetermined gesture.

In another aspect, the present disclosure describes an electronic device. The electronic device includes one or more electromagnetic radiation transmitters and an electromagnetic radiation receiver. The electromagnetic radiation receiver is configured for receiving electromagnetic radiation emitted from the electromagnetic radiation transmitter and reflected by an object. The electronic device also includes a controller configured to: monitor an amplitude of received electromagnetic radiation at the electromagnetic radiation receiver; detect a proximity event by comparing the amplitude to a predetermined proximity threshold; after detecting the proximity event, continue to monitor the amplitude of the received electromagnetic radiation at the electromagnetic radiation receiver; and, in response to detecting the proximity event, perform an analysis on the received electromagnetic radiation to determine whether the received electromagnetic radiation indicates a predetermined gesture.

In yet another aspect, the present disclosure describes a non-transitory computer readable medium comprising computer executable instructions for detecting a contactless gesture on an electronic device. The electronic device has an electromagnetic radiation transmitter and an electromagnetic radiation receiver. The electromagnetic radiation receiver is configured for receiving electromagnetic radiation emitted from the electromagnetic radiation transmitter and reflected by an object. The computer readable storage medium includes: computer executable instructions for monitoring an amplitude of received electromagnetic radiation at the electromagnetic radiation receiver; computer executable instructions for detecting a proximity event by comparing the amplitude to a predetermined proximity threshold; after detecting the proximity event, continuing to monitor the amplitude of the received electromagnetic radiation at the electromagnetic radiation receiver; and, computer executable instructions for, in response to detecting the proximity event, performing an analysis on the received electromagnetic radiation to determine whether the received electromagnetic radiation indicates a predetermined gesture.

Other example embodiments of the present disclosure will be apparent to those of ordinary skill in the art from a review of the following detailed descriptions in conjunction with the drawings.

Example Peripheral Device with Reflectance-Based Input Device

Figure 2:
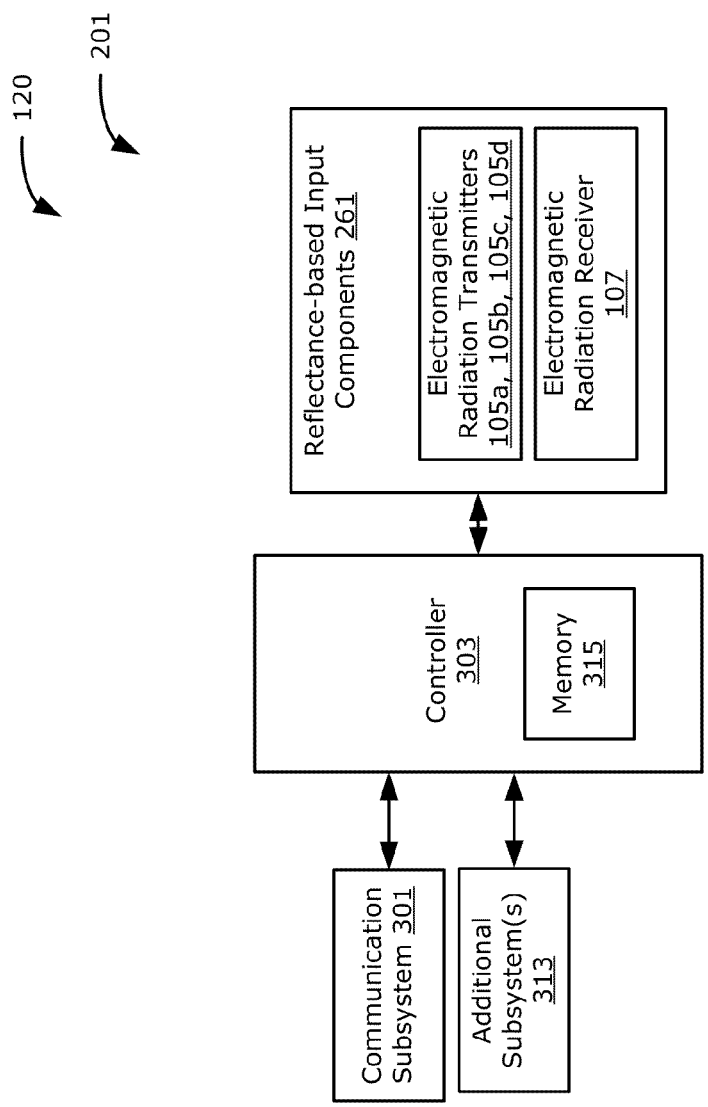
FIG. 2 is a block diagram illustrating components of the peripheral device of FIG. 1 in accordance with example embodiments of the present disclosure.

Reference will now be made to FIGS. 1 and 2 which illustrate an example electronic device 201 which includes reflectance-based input components 261.

The reflectance-based input components 261 are configured to allow a user of the electronic device 201 to input one or more instructions, commands, or other input to a host electronic device. More particularly, the reflectance-based input components 261 may be configured to receive contactless input from a user of the electronic device 201. Contactless input, which may also be referred to as touch-less input, is input which does not require a user to physically touch the electronic device 201. For example, the contactless input may be provided by a user to the electronic device 201 through movement of a hand or other object in a specific region near the electronic device 201.

More particularly, the contactless input may be provided by a user by moving a hand or other object within a sensing area 106 associated with the reflectance-based input components 261 of the electronic device 201. The sensing area 106 may be described as a region of space near the electronic device 201 in which the electronic device 201 is able to monitor movements of objects. More particularly, the sensing area 106 may be described, in one example, as a region of space in which the reflectance-based input components 261 are responsive to object movement, such as the movement of a hand.

In the embodiment of FIG. 1, the reflectance-based input components 261 include one or more electromagnetic radiation transmitters 105a, 105b, 105c, 105d and one or more electromagnetic radiation receivers 107. In order to sense a direction associated with a swipe gesture, the reflectance-based input components 261 may include a plurality of electromagnetic radiation transmitters 105a, 105b, 105c, 105d and/or a plurality of electromagnetic radiation receivers 107. The reflectance-based input components 261 may be housed by a housing 103.

In the example illustrated, the reflectance-based input components 261 include four electromagnetic radiation transmitters 105a, 105b, 105c, 105d. The electromagnetic radiation transmitters 105a, 105b, 105c, 105d are mounted in spaced relation to one another so that each electromagnetic radiation transmitter 105a, 105b, 105c, 105d emits electromagnetic radiation (e.g., in the form of light) at a different region of the electronic device 201. In one example, these electromagnetic radiation transmitters 105a, 105b, 105c, 105d may be generally arranged in a diamond pattern on the electronic device 201. A first electromagnetic radiation transmitter 105a is disposed relatively nearer a top side 111 of the electronic device 201 than the other of the electromagnetic radiation transmitters 105b, 105c, 105d (this electromagnetic radiation transmitter 105a may be referred to as a top electromagnetic radiation transmitter). A second electromagnetic radiation transmitter 105b is disposed relatively nearer to a bottom side 113 of the electronic device 201 than the other of the electromagnetic radiation transmitters 105a, 105c, 105d (this electromagnetic radiation transmitter 105b may be referred to as a bottom electromagnetic radiation transmitter). A third electromagnetic radiation transmitter 105c is disposed relatively nearer a left side 115 of the electronic device 201 than the other of the electromagnetic radiation transmitters 105a, 105b, 105d (this electromagnetic radiation transmitter 105c may be referred to as a left-side electromagnetic radiation transmitter). A fourth electromagnetic radiation transmitter 105d is disposed relatively nearer a right side 117 of the electronic device 201 than the other of the electromagnetic radiation transmitters 105a, 105b, 105c (this electromagnetic radiation transmitter 105d may be referred to as a right-side electromagnetic radiation transmitter).

The electromagnetic radiation transmitters 105a, 105b, 105c, 105d may be in other arrangements in other embodiments and there may be a greater or lesser number of electromagnetic radiation transmitters in other embodiments. For example, in at least some embodiments, the electromagnetic radiation transmitters 105a, 105b, 105c, 105d may be arranged in a pattern of another shape (i.e. a pattern apart from the diamond-shaped pattern illustrated in FIG. 1). By way of further example, in some embodiments, a fewer number of electromagnetic radiation transmitters 105a, 105b, 105c, 105d may be used (e.g. three electromagnetic radiation transmitters 105a, 105b, 105c, 105d may be used in some embodiments). Furthermore, while FIG. 1 illustrates an embodiment in which the electromagnetic radiation transmitters 105a, 105b, 105c, 105d and the electromagnetic radiation receivers 105 are separated from the display, in other embodiments, one or more of these components may be mounted underneath the display.

The electromagnetic radiation transmitters 105a, 105b, 105c, 105d are configured to emit electromagnetic radiation. In at least some embodiments, the electromagnetic radiation transmitters 105a, 105b, 105c, 105d may be infrared diodes which are configured to emit infrared light (in at least some such embodiments, the reflectance-based input components 261 may be referred to as an infrared sensing arrangement). That is, the electromagnetic radiation transmitters 105a, 105b, 105c, 105d may be diodes which emit light which is outside of the visible spectrum.

The electromagnetic radiation transmitters may be configured to emit light (such as infrared light) from one side of the electronic device 201. The side of the electronic device 201 which emits such light may be referred to as the sensing side 119. As illustrated in FIG. 1, the electromagnetic radiation transmitters 105a, 105b, 105c, 105d are mounted along a common plane. More particularly, the electromagnetic radiation transmitters 105a, 105b, 105c, 105d define a plane which passes through each of the electromagnetic radiation transmitters 105a, 105b, 105c, 105d. The plane may pass through the electromagnetic radiation transmitters 105a, 105b, 105c, 105d at a common position on all of the electromagnetic radiation transmitters 105a, 105b, 105c, 105d. For example, the plane may pass through a midpoint of each of the electromagnetic radiation transmitters 105a, 105b, 105c, 105d (e.g. midway between the top of the electromagnetic radiation transmitter 105a, 105b, 105c, 105d and the bottom of the electromagnetic radiation transmitter 105a, 105b, 105c, 105d). The plane may be parallel to a face of the electronic device 201. For example, the plane may be parallel to a display of the electronic device 201.

Each electromagnetic radiation transmitter 105a, 105b, 105c, 105d provides a separate sending channel. Thus, in the illustrated embodiment, four sending channels are provided by the reflectance-based input components 261. A greater or lesser number of sending channels may be used in other embodiments (e.g. the electronic device 201 may have a greater or lesser number of electromagnetic radiation transmitters 105a, 105b, 105c, 105d).

The electromagnetic radiation transmitters 105a, 105b, 105c, 105d may be configured to alternatingly emit a pulse of electromagnetic radiation. For example, infrared light may be alternatingly output from the electromagnetic radiation transmitters so that no two electromagnetic radiation transmitters are emitting light at the same time. That is, each electromagnetic radiation transmitter 105a, 105b, 105c, 105d may take its turn at outputting electromagnetic radiation (e.g. infrared light) while the other electromagnetic radiation transmitters are idle.

When electromagnetic radiation such as light is emitted by an electromagnetic radiation transmitter 105a, 105b, 105c, 105d, the light may be reflected by an object (such as a hand) which is located in a sensing area 106 provided by the reflectance-based input components 261. That is, the light may be reflected by an object which is located at the sensing side 119 of the electronic device 201 (e.g. the side from which infrared light is emitted).

As noted above, the reflectance-based input components 261 also include one or more electromagnetic radiation receivers 107. The electromagnetic radiation receiver 107 is configured for receiving electromagnetic radiation emitted from the electromagnetic radiation transmitters 105a, 105b, 105c, 105d and reflected from an object located in the sensing area 106.

The electromagnetic radiation receiver 107 is a light-sensitive component which generates an electronic signal (such as a potential difference or change in electrical resistance) in dependence on received electromagnetic radiation. For example, the electromagnetic radiation receiver 107 may be a component that is configured to generate a signal in dependence on an amount of received light. The electromagnetic radiation receiver 107 may, therefore, produce a signal that is representative of the light received at the electromagnetic radiation receiver 107. More particularly, the electromagnetic radiation receiver 107 produces a signal that depends on the amount of electromagnetic radiation that was output from an electromagnetic radiation transmitter 105a, 105b, 105c, 105d and reflected by an object and received at the electromagnetic radiation receiver 107. In one example, the electromagnetic radiation receiver 107 is a photodiode. Since the electromagnetic radiation receiver 107 converts one form of energy to another, it may also be referred to as a transducer.

In the embodiment illustrated, a single electromagnetic radiation receiver 107 is provided, which is disposed equidistant from each of the electromagnetic radiation transmitters 105a, 105b, 105c, 105d. In the example illustrated, the electromagnetic radiation receiver 107 is disposed in the middle of the diamond shape formed by the electromagnetic radiation transmitters 105a, 105b, 105c, 105d. The electromagnetic radiation receiver 107 may have a different location or arrangement in other embodiments and, in at least some embodiments, there may be a greater number of electromagnetic radiation receivers 107.

The electromagnetic radiation receiver(s) 107 and electromagnetic radiation transmitter(s) 105a, 105b, 105c, 105d may be mounted on a substrate (not shown), such as a printed circuit board (PCB). In at least some embodiments, the electromagnetic radiation receiver(s) 107 and electromagnetic radiation transmitter(s) 105a, 105b, 105c, 105d may be surface mount components.

The electromagnetic radiation receiver(s) 107 are generally oriented so that they sense little or no direct light from the electromagnetic radiation transmitter(s) 105a, 105b, 105c, 105d. That is, light emitted from the electromagnetic radiation transmitter(s) 105a, 105b, 105c, 105d is not directed at the electromagnetic radiation receiver(s) 107. Instead, the electromagnetic radiation receiver(s) 107 are orientated to capture reflected light from objects located in the sensing area 106. That is, the electromagnetic radiation receiver(s) 107 are oriented to capture light which is emitted from the electromagnetic radiation transmitter(s) 105a, 105b, 105c, 105d and which reflects off of an object and is then directed at the electromagnetic radiation receiver(s) 107. In some embodiments, the electromagnetic radiation receiver(s) 107 are approximately planar with the electromagnetic radiation transmitter(s) 105a, 105b, 105c, 105d.

The reflectance-based input components 261 may be a sub-assembly of the electronic device 201. For example, the reflectance-based input components 261 may be provided as an integrated circuit (IC), which may be connected to other components of the peripheral device 120 via a printed circuit board (PCB).

In the example embodiment, the electronic device 201 is a peripheral device 120. That is, the electronic device 201 is an auxiliary device that connects (via wired or wireless communications) to a host electronic device to expand the capabilities of the host electronic device.

In one example, the host electronic device is a tablet computer. A tablet computer (which may also be referred to as a tablet) is an electronic device which is generally larger than a mobile phone (such as a smartphone) or personal digital assistant. Many mobile phones or personal digital assistants are designed to be pocket sized. That is, mobile phones or personal digital assistants are generally small enough to be carried by a person easily, often in a shirt or pant pocket while tablet computers are larger and may not fit within pant pockets. For example, many tablet computers have a height which is seven inches (7") or more. In some example embodiments, the tablet computer may be a slate computer. A slate computer is a tablet computer which does not include a dedicated keyboard. A slate computer may allow for text input through the use of a virtual keyboard or an external keyboard which connects to the slate computer via a wired or wireless connection.

In another example, the host electronic device may be a smartphone. A smartphone is a mobile phone which offers more advanced computing capability than a basic non-smart cellular phone. For example, a smartphone may have the ability to run third party applications which are stored on the smartphone.

The host electronic device may, in other embodiments, be of another type. The host electronic device may, for example, be a television, a desktop computer, a notebook or laptop computer, a video game console, a navigational device such as a global positioning system (GPS) device, or a host electronic device of another type not specifically mentioned herein.

The host electronic device may be configured to provide a graphical user interface that allows a user to control various features and functions of the host electronic device. The host electronic device may, for example, include a display which may be used, at least in part, for displaying features associated with the graphical user interface. As will be explained in greater detail below, the peripheral device 120 may be used to allow a user to input a command to the host electronic device using a contactless gesture.

More particularly, the peripheral device 120 may be an input device which may be used for receiving reflectance-based input. The peripheral device 120 may be used for receiving reflectance-based input, but the reflectance-based input may control the host electronic device. That is, the host electronic device may perform a function based on the reflectance-based input received at the peripheral device 120.

In the example illustrated, the peripheral device 120 is a wrist watch. That is, in addition to the reflectance-based input components 261 which allow the peripheral device 120 to receive reflectance-based input, the peripheral device 120 includes a wrist strap that allows the peripheral device 120 to be secured to a user's hand (i.e. it is secured at the wrist).

The peripheral device 120 may take other forms apart from that illustrated in FIG. 1. For example, in some embodiments, the peripheral device 120 may be formed to resemble a typical remote control. For example, the peripheral device 120 may be an elongate device, may be substantially rectangular and may have a length that is three or more times its width (e.g. it may resemble a standard television remote control). Such a peripheral device 120 may be used, in at least some embodiments, for controlling a host electronic device that is a television.

In other examples, the peripheral device 120 may be a head-mounted electronic device such as a visor, a cap, a device configured for attachment to an ear (such as a wireless audio device, including a Bluetooth™ audio headset), a headband, etc. Accordingly, in at least some embodiments, the peripheral device 120 may be a wearable peripheral device 120 (i.e. it may be configured to be worn by a user).

In yet other examples (an example of which will be illustrated below with reference to FIG. 10), the peripheral device 120 may be a docking station. A docking station is a device that is configured to receive the host electronic device and to provide complementary functions to the host electronic device. For example, the docking station may include one or more ports to allow the host electronic device to connect to an external components, such as an external power supply, a network, other peripheral devices such as a speaker, microphone, camera, an external display, etc. In at least some embodiments, the docking station may include a universal serial bus (USB) hub that allows various USB devices to be connected to the host electronic device via the docking station.

The peripheral device 120 may also include other components which may provide other features or functions apart from the ability to receive contactless input. For example, in the example of FIG. 1, the peripheral device 120 may include a timing circuit or mechanism which allows the peripheral device 120 to output the current time (e.g. to a display associated with the peripheral device 120). In some embodiments (such as some embodiments where the peripheral device 120 is a head-mounted electronic device), the peripheral device 120 may include components associated with audio communications including a speaker and a microphone.

Thus, the peripheral device 120 may provide for other functions in addition to the contactless gesture capabilities described herein.

As noted previously, to allow the peripheral device 120 to receive contactless input, the peripheral device 120 includes reflectance-based input components 261. As will be discussed in greater detail below, in at least some embodiments, the reflectance-based input components 261 may be used by the peripheral device 120 to allow the peripheral device 120 to interpret a contactless gesture. That is, the reflectance-based input components 261 may be used by the peripheral device 120 to determine whether a hand or other object is present within the sensing area 106. In at least some embodiments, the reflectance-based input components 261 may be used by the electronic device 201 to determine whether a hand or other object is moved within a sensing area 106 associated with the reflectance-based input components 261 and the type of movement (which may also be referred to as the "gesture type") provided by the hand.

One type of movement that may be detected by the peripheral device 120 may, for example, be an inward vertical gesture which may, in at least some examples, be referred to as a zoom-in gesture. The inward vertical gesture is characterized by a movement of an object (such as a hand) in a direction that is generally perpendicular to the plane formed by the electromagnetic radiation transmitters 105a, 105b, 105c, 105d and that proceeds from a position in which the object is away from the electronic device 201 to a position in which the object is relatively nearer the electronic device 201.

Another type of movement that may be detected by the peripheral device 120 may, for example, be an outward vertical gesture which may, in at least some embodiments, be referred to as a zoom-out gesture. The outward vertical gesture is characterized by a movement of an object (such as a hand) in a direction that is generally perpendicular to the plane formed by the electromagnetic radiation transmitters 105a, 105b, 105c, 105d, and that proceeds from a position in which the object is near the electronic device 201 to a position in which the object is relatively further away from the electronic device 201.

Another type of movement that may be detected by the peripheral device 120 may, for example, be a swipe gesture which may also be referred to as a horizontal gesture. A swipe gesture is characterized by a movement of an object (such as a hand) in a direction that is generally parallel to the plane formed by the electromagnetic radiation transmitters 105a, 105b, 105c, 105d. As will be described in greater detail below, in at least some embodiments, the use of multiple electromagnetic radiation transmitters 105a, 105b, 105c, 105d and/or multiple electromagnetic radiation receivers 107 allows the direction of a swipe gesture to be determined by the electronic device 201. For example, in some embodiments, the electronic device 201 may determine whether a swipe gesture is a downward swipe gesture (which is characterized by movement from the top side 111 to the bottom side 113 of the electronic device 201), an upward swipe gesture (which is characterized by movement from the bottom side 113 of the electronic device 201 to the top side 111 of the electronic device 201), a rightward swipe gesture (which is characterized by movement from the left side 115 of the electronic device 201 to the right side 117 of the electronic device 201), or a leftward swipe gesture (which is characterized by movement from the right side 117 of the electronic device 201 to the left side 115 of the electronic device 201).

Another type of movement that may be detected may, for example, be a hover gesture. A hover gesture occurs when an object (such as a hand) remains stationary within the sensing area 106 provided by the reflectance-based input components 261 for at least a predetermined time.

Accordingly, in at least some embodiments, based on the reflected light received at the electromagnetic radiation receiver, the electronic device 201 may determine whether one or more gestures have been performed.

Where the electronic device 201 having the reflectance-based input components 261 is a peripheral device 120, when a gesture is identified, the electronic device 201 may transmit a signal to the host electronic device associated with the peripheral device 120 based on the type of movement associated with the gesture. For example, in at least some embodiments, the peripheral device 120 may transmit a code that is unique to the type of gesture performed. In response, the host electronic device may perform a function associated with the code.

Example Peripheral Device

Referring now to FIG. 2, a block diagram of an example electronic device 201 that is a peripheral device 120 is illustrated. The example peripheral device 120 includes the reflectance-based input components 261 described above with reference to FIG. 1. More particularly, the example peripheral device 120 includes one or more electromagnetic radiation transmitters 105a, 105b, 105c, 105d and one or more electromagnetic radiation receivers 107. One or more of the reflectance based input components 261 may, in at least some embodiments, output (e.g. to a controller 303) one or more signals associated with a plurality of channels (such as the sending channels described above). For example, the electromagnetic radiation receiver 107 may generate one or more signals in response to the amount of electromagnetic radiation received at the electromagnetic radiation receiver 107.

The signal(s) may separate received electromagnetic radiation into a plurality of channels. That is, the signal(s) may be structured so that it is possible to associate received electromagnetic radiation with the electromagnetic radiation transmitter 105a, 105b, 105c, 105d that caused that electromagnetic radiation to be received. Accordingly, each channel represented by the signal(s) may indicate the amount of electromagnetic radiation received that is attributable to a different one of the electromagnetic radiation transmitters 105a, 105b, 105c, 105d. That is, each channel may be associated with a different electromagnetic radiation transmitter 105a, 105b, 105c, 105d.

Since each electromagnetic radiation transmitter 105a, 105b, 105c, 105d is separated from the other electromagnetic radiation transmitters 105a, 105b, 105c, 105d, each channel represents movement of an object in a different region near the electronic device. Thus, the use of multiple electromagnetic radiation transmitters 105a, 105b, 105c, 105d may allow for greater precision when identifying gestures (since it allows activity in multiple regions to be detected). It will be appreciated that a similar result (i.e. multiple channels to represent movement in different regions) could be accomplished using multiple electromagnetic radiation receivers 107 and a single electromagnetic radiation transmitter 105a, 105b, 105c, 105d (or multiple electromagnetic radiation receivers 107 and multiple electromagnetic radiation transmitters 105a, 105b, 105c, 105d) and that such embodiments are also contemplated.

The peripheral device 120 further includes a controller 303 which is connected to at least some of the reflectance-based input components 261. The controller 303 may be configured to receive the one or more signals that represent the received electromagnetic radiation at the electromagnetic radiation receiver(s) 107. As noted above, the signal(s) may attribute received electromagnetic radiation to associated channels. That is, the signal(s) allow the controller to separate the received electromagnetic radiation for each channel, allowing the controller to associate movement with a more specific region near the electronic device 201.

The controller 303 is, in at least some embodiments, a microcontroller such as an 8 bit or a 16 bit microcontroller. The controller 303 is configured to determine, from the signal(s) received from the reflectance-based input components 261, whether a gesture of one or more predetermined types has been performed. To do so, the controller 303 may be configured to perform one or more of the methods described with reference to FIGS. 3 and 4 to identify a gesture. In at least some embodiments, the controller 303 may identify a gesture type associated with the gesture performed (e.g. it may identify whether movement of an object in the sensing area 106 (FIG. 1) represents an inward vertical gesture, an outward vertical gesture, a swipe gesture (and, in some embodiments, the direction of the swipe e.g. whether it is a downward swipe gesture, an upward swipe gesture, a rightward swipe gesture, or a leftward swipe gesture), a hover gesture, and/or whether such movement is not recognized as a gesture).

It will be appreciated that the methods described herein may be used with a controller 303 having very limited resources and that, even where the methods are used with controllers having substantial resources (such as a processor), these methods use few resources, thereby allowing excess resources to be used for other purposes.

The peripheral device 120 includes memory 315. As will be described in greater detail below in the description of the methods, the memory may be used to store data received from one or more of the reflectance-based input components 261 which may be used for determining whether a contactless gesture has been performed.

The memory 315 may take different forms in different embodiments. In the embodiment illustrated, the memory 315 is on-board memory on the controller 303. That is, the memory 315 is integrated with the controller 303. However, in other embodiments, external memory (i.e. memory that is not on-board the controller 303) may be used instead of or in addition to the on-board memory. The memory 315 may, in some embodiments, include any one or more of the following memory types: flash memory, random access memory (RAM), read only memory (ROM), a hard disk drive (HDD), and/or a solid state drive (SSD). Other types of memory may be used in other embodiments and, it will be appreciated that the peripheral device 120 may include a plurality of memories including memories of various types.

In at least some embodiments, the peripheral device 120 may include timing components. The timing components may be hardware or software based components which may be used to cause the electromagnetic radiation transmitter(s) 105a, 105b, 105c, 105d to emit electromagnetic radiation (e.g. a pulse of infrared light) according to a timing schedule. In at least some embodiments, the controller 303 is configured to cause the electromagnetic radiation transmitters 105a, 105b, 105c, 105d to alternatingly output a pulse of light. That is, the controller 303 may cause a pulse of electromagnetic radiation (e.g. infrared light) to be alternatingly output from each of a plurality of electromagnetic radiation transmitters 105a, 105b, 105c, 105d. More particularly, the controller 303 may be configured to trigger the electromagnetic radiation transmitters 105a, 105b, 105c, 105d so that no two electromagnetic radiation transmitters 105a, 105b, 105c, 105d emit electromagnetic radiation (e.g. light) at any given time. That is, while one electromagnetic radiation transmitter 105a, 105b, 105c, 105d is emitting electromagnetic radiation (e.g. in the form of light), the controller 303 may cause the other electromagnetic radiation transmitters 105a, 105b, 105c, 105d to remain idle (i.e. to not emit any electromagnetic radiation (e.g. in the form of light)).

Accordingly, in at least some embodiments, the controller 303 is configured to trigger the electromagnetic radiation transmitters 105a, 105b, 105c, 105d one-by-one. After an electromagnetic radiation transmitter 105a, 105b, 105c, 105d is triggered, the controller 303 may wait before triggering another one of the electromagnetic radiation transmitters 105a, 105b, 105c, 105d. For example, after an electromagnetic radiation transmitter 105a, 105b, 105c, 105d is triggered, the controller 303 may wait a predetermined period of time before triggering another electromagnetic radiation transmitters 105a, 105b, 105c, 105d. This period of time may allow the electronic device 201 to observe the amount of light that is reflected following each pulse. The controller 303 may alternatingly trigger the electromagnetic radiation transmitters 105a, 105b, 105c, 105d until all of the electromagnetic radiation transmitters 105a, 105b, 105c, 105d have been triggered (i.e. until all of the electromagnetic radiation transmitters 105a, 105b, 105c, 105d have had an opportunity to emit a pulse of light). After all of the electromagnetic radiation transmitters 105a, 105b, 105c, 105d have been triggered, the controller 303 may begin the triggering process again. For example, the controller 303 may then cause an electromagnetic radiation transmitter 105a, 105b, 105c, 105d which was already triggered (i.e. which already emitted light) to do so again.

While the timing components described above were described as being provided by the controller 303, in other embodiments, the timing components may be provided by other components. For example, in some embodiments, the reflectance-based input components 261 may be a sub-assembly that includes timing hardware and/or software that may be used for triggering the electromagnetic radiation transmitters 105a, 105b, 105c, 105d.

The controller 303 is electrically connected to at least some of the reflectance-based input components 261. For example, the controller 303 may be coupled with the electromagnetic radiation receiver 107 and may be configured to receive one or more signals which are representative of the light received by the electromagnetic radiation receiver 107. That is, the signals which are output by the electromagnetic radiation receiver 107 and received at the controller 303 may indicate the amount of light received at the electromagnetic radiation receiver 107.

In at least some embodiments, the controller 303 (and/or another component) is configured to sample the electromagnetic radiation (e.g. light) received at the electromagnetic radiation receiver 107 during or immediately after each pulse of electromagnetic radiation (e.g. light) emitted from electromagnetic radiation transmitters 105a, 105b, 105c, 105d. That is, when one of the electromagnetic radiation transmitters 105a, 105b, 105c, 105d emits a pulse of light, the controller 303 observes the amount of light that is received at the electromagnetic radiation receiver 107. That is, the controller 303 may be configured to observe the amount of light received at the electromagnetic radiation receiver 107 as a result of a pulse of light being emitted from an electromagnetic radiation transmitter 105a, 105b, 105c, 105d.

Such sampling functions may, in some embodiments, be provided by a component that is integrated with the reflectance-based input components 261. In at least some such embodiments, the sub-assembly may include components configured for sampling the electromagnetic radiation receiver 107. The raw sampled data may then be provided by such components to the controller 303 to allow the controller 303 to determine whether a contactless gesture has been performed.

The peripheral device 120 includes a communication subsystem 301 coupled with the controller 303. The communication subsystem 301 allows the peripheral device 120 to communicate with a host electronic device equipped with a compatible communication subsystem. The communication subsystem 301 is, in at least some embodiments, a short-range communication subsystem. The communication subsystem 301 may be a wireless communication subsystem (such as Wi-Fi, Bluetooth™ or another radio frequency (RF) based communication subsystem that allows for wireless communications) or may be a wired communication subsystem (which allows for a physical wire to connect the peripheral device 120 to the host electronic device). By way of example, the communication subsystem 301 may include an infrared device and associated circuits and components, or a wireless bus protocol compliant communication mechanism such as a Bluetooth® communication module to provide for communication with similarly-enabled systems and devices.

In at least some embodiments, in response to identifying a contactless gesture, the peripheral device 120 may send a predetermined code or command that is unique to the type of gesture performed to the electronic device. In at least some embodiments, the code or command may be passed via USB-ID to the host electronic device. The code or command may be transmitted to the host electronic device as one or more byte, having a value that depends on the specific gesture identified. A look up table stored in memory 315 may, for example, be used to associate a gesture type with a specific code or command. By way of example the following is a listing of one possible set of codes/commands that may be output from the peripheral device 120 in response to movement within the sensing area 106 (FIG. 1):

rightward swipe gesture (i.e. left to right swipe): 0×01
leftward swipe gesture (i.e. right to left swipe): 0×02
downward swipe gesture (i.e. top to bottom swipe): 0×04
upward swipe gesture (i.e. bottom to top swipe): 0×08
outward vertical gesture: 0×10
inward vertical gesture: 0×20
hover gesture: 0×40
non-recognized gesture: 0×00

As noted above, in at least some embodiments, the peripheral device 120 may be a multi-purpose peripheral device. That is, in addition to the ability to detect contactless gestures, the peripheral device 120 may be equipped to perform other functions such as, for example, acting as an auxiliary output device for the host electronic device. The peripheral device 120 may include one or more additional subsystems 313, which may be configured for providing one or more of these additional functions. For example, in the embodiment illustrated in FIG. 2, the peripheral device also acts as a watch. In this embodiment, the peripheral device 120 may include additional components, such as a timing circuit or mechanism which allows the peripheral device 120 to output the current time and may include a display for displaying the time. By way of further example, as discussed above, in at least some embodiments, the peripheral device 120 may be a head-mounted electronic device that is also configured to provide enhanced audio communication capabilities to the host electronic device (such as hands-free audio). In such examples, the additional subsystem(s) 313 may include a speaker for outputting audio and a microphone for inputting audio. By way of further example, in some embodiments, the additional subsystems 313 may include a display for displaying an output associated with the host electronic device (e.g. for displaying a graphical user interface (GUI) associated with the host electronic device).

Example Methods for Identifying Reflectance-Based Gestures

Figure 3:
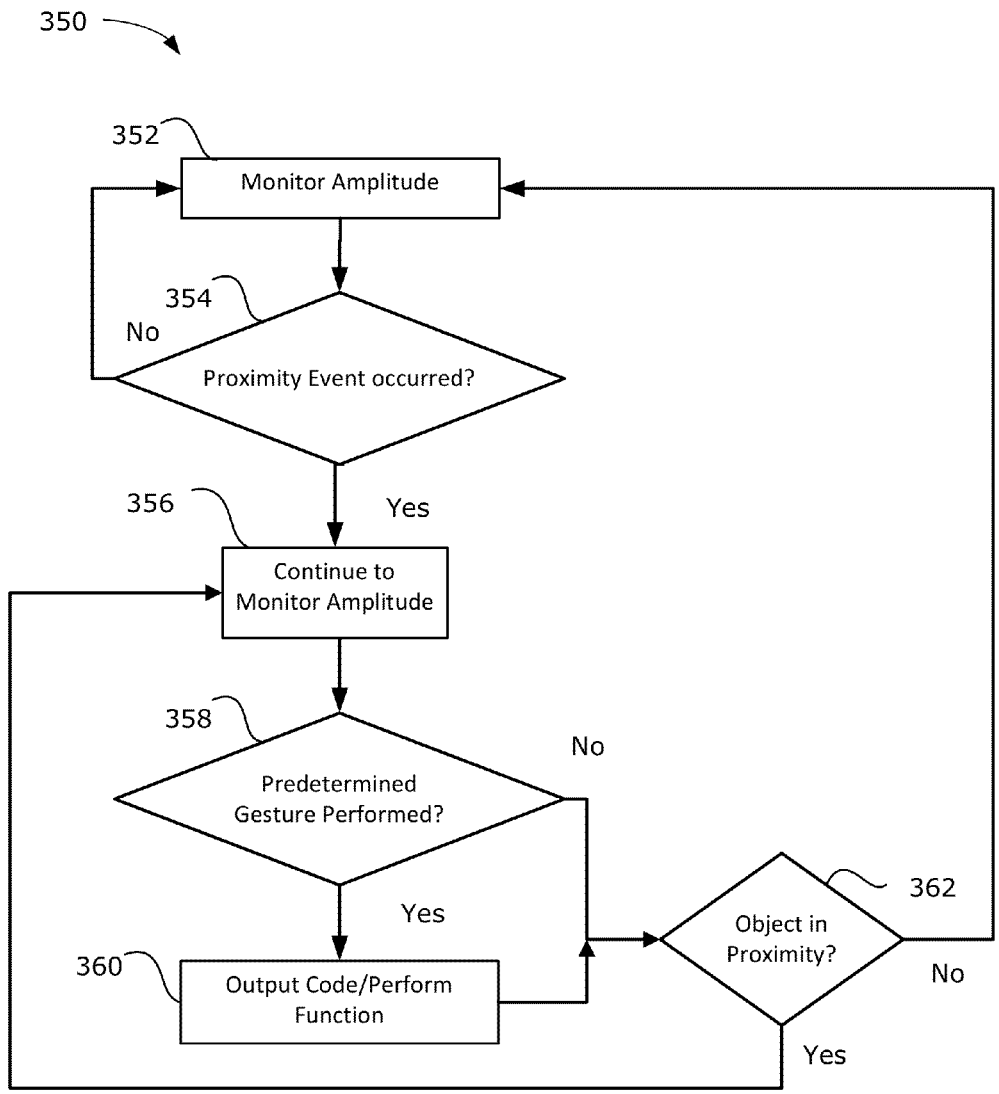
FIG. 3 is an example method of detecting a gesture in accordance with example embodiments of the present disclosure.

Referring now to FIG. 3, an example method 350 for identifying a reflectance-based gesture on an electronic device 201 such as a peripheral device 120 (FIGS. 1 and 2) is illustrated in flowchart form. The method 350 includes features which may be provided by an electronic device 201, such as the peripheral device 120 of FIGS. 1 and 2. For example, one or more application or module associated with the electronic device 201 may contain processor readable instructions for causing a processor or controller associated with the electronic device 201 to perform one or more steps of the method 350 of FIG. 3. In at least some embodiments, a controller 303 of a peripheral device 120 is configured to perform the method 350 of FIG. 3.

In at least some embodiments, one or more functions or features of the method 350 may be performed by or rely upon the reflectance-based input components 261. In at least some embodiments, one or more of the functions or features of the method 350 of FIG. 3 may be performed, in whole or in part, by another system, software application, module, component or device apart from those specifically listed above.

The method 350 includes, at 352, monitoring the amplitude of received electromagnetic radiation at the electromagnetic radiation receiver 107. More particularly, at 352, the reflectance-based input components 261 of the electronic device 201 may be used to repeatedly perform a reflectance measuring routine. The reflectance measuring routine may be controlled by the controller 303 (FIG. 3) or by other timing components.

During the reflectance measuring routine, the electromagnetic radiation transmitters 105a, 105b, 105c, 105d of the electronic device 201 are alternatingly activated. For example, a pulse of infrared light to be alternatingly output from each of a plurality of electromagnetic radiation transmitters 105a, 105b, 105c, 105d. Accordingly, during each cycle of the reflectance measuring routine, a pulse of electromagnetic radiation (e.g. infrared light) may be output from each of the electromagnetic radiation transmitters 105a, 105b, 105c, 105d.

In at least some embodiments, during the reflectance measuring routine, electromagnetic radiation (e.g. infrared light) is only output from one of the electromagnetic radiation transmitters 105a, 105b, 105c, 105d at any given time. That is, each electromagnetic radiation transmitter 105a, 105b, 105c, 105d may take its turn at outputting electromagnetic radiation while the other electromagnetic radiation transmitters 105a, 105b, 105c, 105d are idle. For example, during the reflectance measuring routine, electromagnetic radiation may be first output from the first electromagnetic radiation transmitter 105a while the other electromagnetic radiation transmitters 105b, 105c, 105d emit no light and then electromagnetic radiation may be output from another one of the electromagnetic radiation transmitters 105b, 105c, 105d, such as a second electromagnetic radiation transmitter 105b while the other electromagnetic radiation transmitters 105a, 105c, 105d emit no electromagnetic radiation (e.g. while they emit no light), and then electromagnetic radiation may be output from another one of the electromagnetic radiation transmitters 105a, 105b, 105c, 105d, such as the third electromagnetic radiation transmitter 105c while the other electromagnetic radiation transmitters 105a, 105b, 105d emit no electromagnetic radiation, and then electromagnetic radiation may be output from another one of the electromagnetic radiation transmitters 105a, 105b, 105c, 105d, such as the fourth electromagnetic radiation transmitter 105d while the other electromagnetic radiation transmitters 105a, 105b, 105c emit no electromagnetic radiation.

During the reflectance measuring routine, the amount of electromagnetic radiation (i.e. infrared light) received at the electromagnetic radiation receiver 107 during (or immediately after) each pulse is monitored. That is, the amount of light received at the electromagnetic radiation receiver 107 as a result of the pulses is monitored and may be temporarily logged. By way of example, in some embodiments, the controller 303 may act as a receiver and may be connected to the electromagnetic radiation receiver 107. The controller 303 may receive signals from the electromagnetic radiation receiver 107 which are representative of the light received by the electromagnetic radiation receiver 107. That is, the signals which are output by the electromagnetic radiation receiver 107 and received at the controller 303 may be proportional to the amount of electromagnetic radiation (e.g. light) received at the electromagnetic radiation receiver 107. In at least some embodiments, the controller 303 stores data representing the received light to a memory 315, such as in a cache.

During the reflectance measuring routine performed at 352, received electromagnetic radiation is associated with the electromagnetic radiation transmitter 105a, 105b, 105c, 105d which caused that received electromagnetic radiation. That is, the controller 303 tracks which electromagnetic radiation transmitter 105a, 105b, 105c, 105d was triggered immediately before the receipt of the light at the electromagnetic radiation receiver 107 and associates that electromagnetic radiation transmitter 105a, 105b, 105c, 105d with that received light. In one example, the controller 303 does not meld the received electromagnetic radiation caused by all of the electromagnetic radiation transmitters 105a, 105b, 105c, 105d. The controller 303 handles the data regarding the received electromagnetic radiation so that an association between the received electromagnetic radiation and the electromagnetic radiation transmitter 105a, 105b, 105c, 105d which caused that received electromagnetic radiation is maintained. Accordingly, the received electromagnetic radiation is associated with a plurality of channels. Each channel is associated with a separate one of the plurality of electromagnetic radiation transmitters.

As will be described in greater detail below, by maintaining an association between the received electromagnetic radiation and the electromagnetic radiation transmitter 105a, 105b, 105c, 105d which caused that received electromagnetic radiation, the electronic device 201 is able to monitor reflectance in various regions of the sensing area 106 (FIG. 1) changes over time. As will be described in greater detail below, this information may permit the direction associated with a horizontal gesture (which may also be referred to as a swipe gesture) to be determined.

In order to monitor changes in reflected light caused by each of the electromagnetic radiation transmitters 105a, 105b, 105c, 105d, the reflectance measuring routine may be performed repeatedly. That is, the reflectance measuring routine may be performed more than once so that it is possible to assess reflectance changes in various regions of the electronic device 201 over time. Accordingly, in at least some embodiments, each of the electromagnetic radiation transmitters 105a, 105b, 105c, 105d may emit a plurality of pulses of electromagnetic radiation during 352 of FIG. 3.

Thus, at 352, the electronic device 201 effectively monitors changes in reflected electromagnetic radiation at various regions of the electronic device 201 over time.

Referring still to FIG. 3, at 354, the controller 303 determines, based on the received electromagnetic radiation, if a proximity event has occurred. More particularly, at 354, the controller 303 detects a proximity event by comparing the amplitude of received electromagnetic radiation to a predetermined proximity threshold 510 (FIGS. 5 to 9).

A proximity event occurs when an object that reflects the electromagnetic radiation emitted from the electromagnetic radiation transmitters 105a, 105b, 105c, 105d is moved in close proximity to the electronic device 201. More particularly, the proximity event occurs when an object, such as a hand, is moved within the sensing area 106 (FIG. 1) associated with the reflectance-based input components 261. The predetermined proximity threshold 510 may be a value, stored in memory 315 (FIG. 2), which represents typical amplitude readings at the electromagnetic radiation receiver 107 when a hand is brought within a threshold distance of the electronic device 201. For example, in one embodiment, the predetermined proximity threshold 510 represents a typical amplitude when a hand is within the sensing area 106 and when it is within twenty (20) centimeters (cm) from the electronic device 201. Thresholds based on other distances may be used in other embodiments.

Thus, in at least some embodiments, the controller 303 compares the amplitude of received electromagnetic radiation to the predetermined proximity threshold and, if the amplitude is greater than the predetermined proximity threshold, the controller determines that a proximity event has occurred.

If a proximity event has not occurred, the controller 303 may continue to monitor the received electromagnetic radiation (as represented at 352) at the electromagnetic radiation receiver 107. Similarly, after a proximity event has occurred, the controller 303 may continue to monitor the received electromagnetic radiation (as represented at 356) at the electromagnetic radiation receiver 107. Thus, the detection of the proximity event may not cause the electronic device 201 to cease monitoring the electromagnetic radiation. However, the detection of the proximity event may cause a further process to be initiated. More specifically, as illustrated at 358, in response to detecting the proximity event, the controller 303 may perform an analysis on the received electromagnetic radiation (which may include the electromagnetic radiation received at 352 and/or the electromagnetic radiation received at 356) to determine whether the received electromagnetic radiation indicates a predetermined gesture.

Thus, the proximity event detection that occurs at 354 may be used to limit the processing capabilities required to detect a gesture. The proximity event acts as a trigger, informing the electronic device 201 to begin looking for a possible gesture. Accordingly, in at least some embodiments, the electronic device 201 only attempts to identify a gesture when the proximity event is detected.

Figure 4:
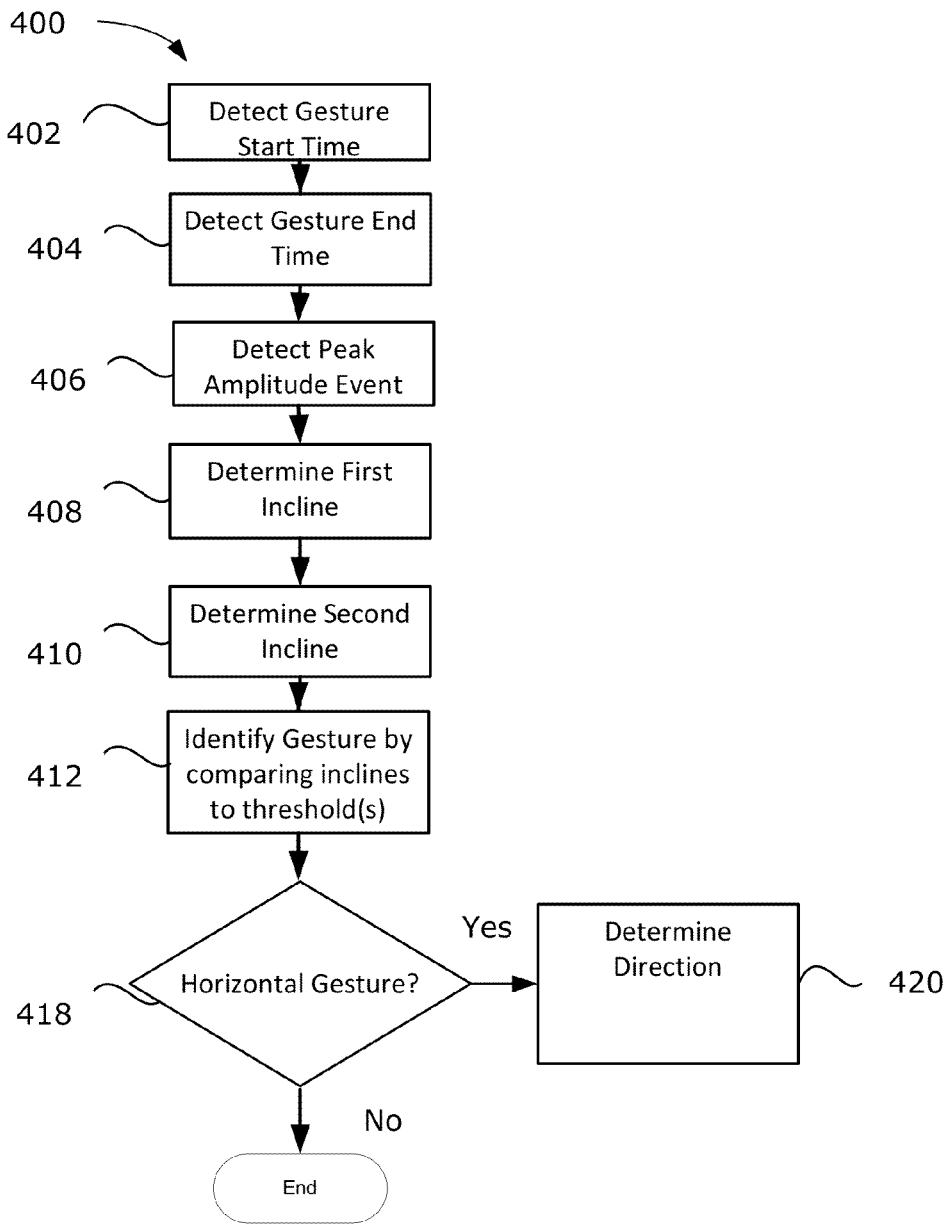
FIG. 4 is an example method of detecting a gesture in accordance with example embodiments of the present disclosure.

Specific techniques that may be used at 358 to detect a gesture will be described in greater detail below with reference to FIG. 4.

In at least some embodiments, if it is determined, at 358, that a gesture corresponding to a predetermined gesture has been performed, then at 360, the electronic device 201 may output a code to a host electronic device and/or may perform an on-device function. As noted previously, in at least some embodiments, the electronic device 201 may be a peripheral device 120 associated with a host electronic device. In such embodiments, when the analysis performed on the received electromagnetic radiation indicates a predetermined gesture (i.e. when it indicates that the predetermined gesture has been performed), then a code that is unique to that predetermined gesture may be output to the host electronic device. A sample of one possible assignment of codes to gestures was discussed above. The code may be retrieved from memory 315 based on the gesture identified and output from the peripheral device 120 using a communication subsystem 301 that is associated with the peripheral device 120 and that is used for communicating with a host electronic device.

In at least some embodiments, at 358, when the predetermined gesture is detected, the electronic device 201 and/or a host electronic device associated with the electronic device 201, may perform one or more functions corresponding to the detected gesture. For example, where an inward vertical gesture is detected, a zoom in function may be performed and, when an outward vertical gesture is detected, a zoom out function may be performed. Similarly, a horizontal gesture may cause a scrolling function or navigation function to be performed and the direction of scrolling or navigation may depend on the direction associated with the horizontal gesture (e.g. a top to bottom swipe may have a different result than a bottom to top swipe). In some embodiments, a hover gesture may result in a selection function being performed (i.e. the hover gesture may cause an operation similar to a click of a mouse). Other functions may be assigned to other gestures apart from those discussed herein.

In some embodiments, in response to detecting a gesture, feedback may be provided on the electronic device 201 and/or a host electronic device to inform a user of the gesture type associated with the gesture detected. For example, an audible or visual notification may inform the user that a gesture was detected and, in at least some embodiments, the type of that gesture (e.g. whether it was an inward vertical gesture, hover, outward vertical gesture, etc.).

The electronic device 201 may continue to monitor (at 362) whether an object remains in proximity to the electronic device 201. That is, the electronic device 201 may continue to monitor whether the amplitude of received electromagnetic radiation remains above the predetermined proximity threshold. While this step is illustrated in FIG. 3 as being performed after step 360 (i.e. after the code is output and/or after the feature corresponding to the gesture is performed) and also after it is determined (at 358) that a predetermined gesture has not been performed, this step may occur at other places. For example, in at least some embodiments, proximity may continuously be monitored as a parallel process to some of the other features provided by the method 350.

In at least some embodiments, when an object is no longer in proximity, the method 350 may stop attempting to determine whether subsequent received electromagnetic radiation measurements represent a predetermined gesture until another proximity event occurs. That is, the method may return to 352 and the analysis at 358 may not be performed on the subsequent received electromagnetic radiation measurements until another proximity event has been detected at 354.

If, however, at 362 it is determined that an object remains in proximity, then subsequent received electromagnetic radiation measurements (obtained at 356) may be analyzed at 358 to determine whether a predetermined gesture has been performed.

Methods that may be performed at 358 to determine whether a predetermined gesture has been performed will now be discussed. Referring now to FIG. 4, an example method 400 for identifying a reflectance-based gesture on an electronic device 201 such as a peripheral device 120 (FIGS. 1 and 2) is illustrated in flowchart form. The method 400 includes features which may be provided by an electronic device 201, such as the peripheral device 120 of FIGS. 1 and 2. For example, one or more application or module associated with the electronic device 201 may contain processor readable instructions for causing a processor or controller associated with the electronic device 201 to perform one or more steps of the method 400 of FIG. 4. In at least some embodiments, a controller 303 of a peripheral device 120 is configured to perform the method 400 of FIG. 4.

In at least some embodiments, one or more functions or features of the method 400 may be performed by or rely upon the reflectance-based input components 261. In at least some embodiments, one or more of the functions or features of the method 400 of FIG. 4 may be performed, in whole or in part, by another system, software application, module, component or device apart from those specifically listed above.

As noted above, the method 400 may be performed during step 358 of the method 350 of FIG. 3.

At 402, the electronic device 201 detects a gesture start time 502 (FIGS. 5 to 9) based on the amplitudes of received electromagnetic radiation. More particularly, the gesture start time 502 is detected by evaluating a series of received amplitudes according to one or more predetermined rules.

For example, in some embodiments, one of the predetermined rules specifies that the gesture start time 502 occurs when the proximity event is detected. That is, when the amplitudes of received electromagnetic radiation transition from being below the predetermined proximity threshold 510 (FIGS. 5 to 9) to being above the predetermined proximity threshold, then the gesture start time 502 is established. An example of one such scenario will be discussed in greater detail below with reference to the inward vertical gesture described in FIG. 5.

Figure 7:
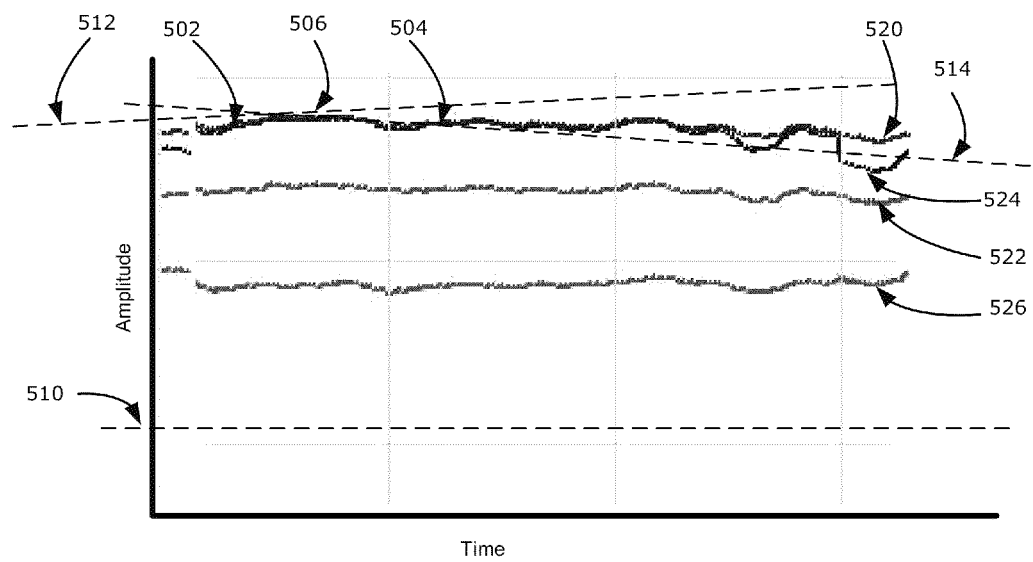
FIG. 7 is an example electromagnetic radiation receiver output for a hover gesture in accordance with example embodiments of the present disclosure.

In some embodiments, a gesture start time may be established after an object has been stationary and in proximity to the electronic device for a predetermined period of time. For example, in some cases, a user may perform a gesture and may, after the gesture is performed, leave their hand stationary within the sensing area 106 (i.e. they may leave their hand in a hover position) in order to allow a subsequent gesture to be performed. In such cases, in order to detect a gesture start time, the controller 303 may detect a period of relative stability in received electromagnetic radiation while the amplitude of received electromagnetic radiation remains above the predetermined proximity threshold and, if the period exceeds a predetermined time threshold, the controller 303 may determine that a gesture start time has occurred. The period of relative stability occurs when the amplitudes remain above the predetermined proximity threshold but when they remain relatively constant. The determination of whether the amplitudes of received electromagnetic radiation remain relatively constant may be made based on one or more predetermined threshold or criteria. By way of example, FIG. 7 illustrates one example of a hover gesture which is initiated from a hover position (i.e. it is initiated when a hand is already in proximity). In this example, the gesture start time may be established after the amplitude for each channel of received electromagnetic radiation has remained stable for at least a predetermined time.

Alternatively, in some embodiments, when starting from the hover position, the gesture start time may be established when the amplitude of received electromagnetic radiation falls by a predetermined amount from its peak value. For example, when the amplitude has remained relatively stable but when it has decayed by a predetermined percentage from its peak during the period of relative stability (e.g. when it is 85% of its peak), then the gesture start time may be established.

In at least some embodiments, the amplitude of received electromagnetic radiation at the gesture start time may be recorded along with the gesture start time. That is, these values may be stored in the memory 315 (FIG. 3).

Figure 5:
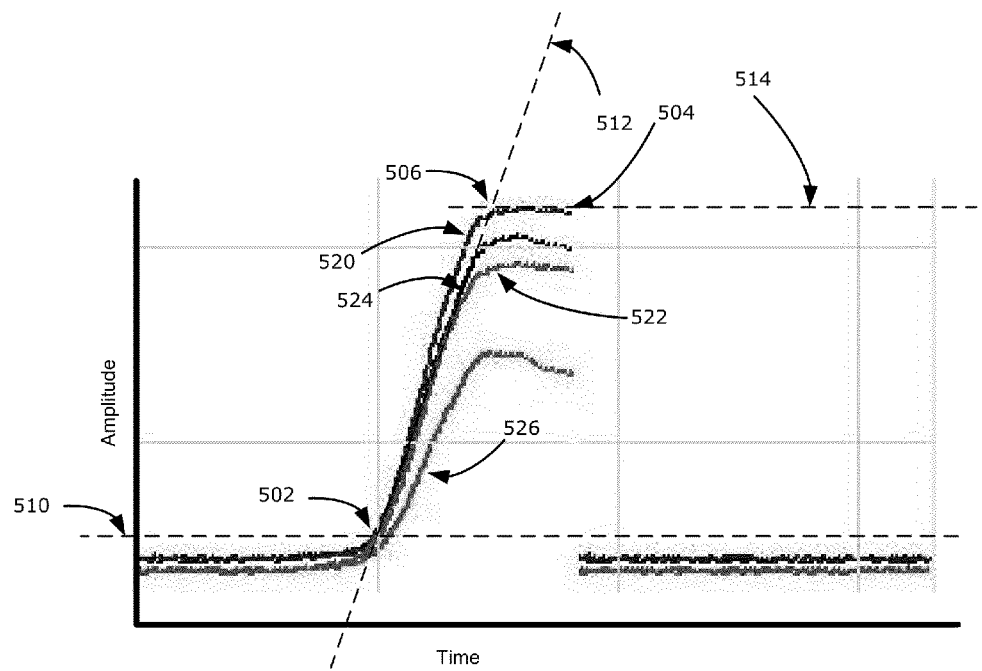
FIG. 5 is an example electromagnetic radiation receiver output for an inward vertical gesture in accordance with example embodiments of the present disclosure.
Figure 6:
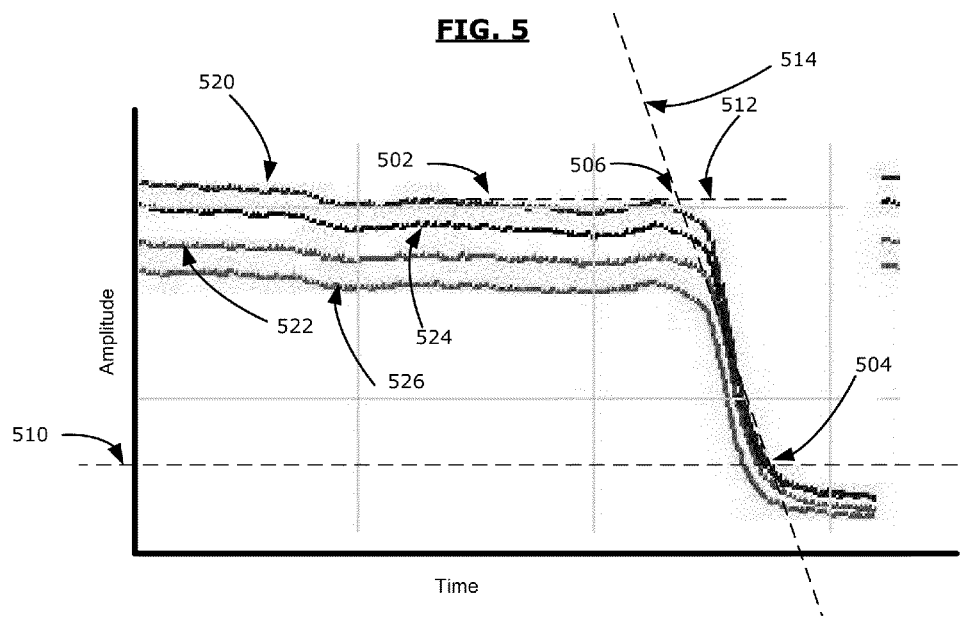
FIG. 6 is an example electromagnetic radiation receiver output for an outward vertical gesture in accordance with example embodiments of the present disclosure.

After the gesture start time has been set, in at least some embodiments, the controller 303 may begin to detect (at 404) a gesture end time 504 (FIGS. 5 to 9). The gesture end time may also be established according to one or more predetermined rules. In at least some embodiments, the gesture end time is established when the amplitude of received electromagnetic radiation falls below the predetermined proximity threshold. That is, when an object is no longer in proximity to the electronic device, then the gesture end time may be established. Accordingly, the gesture end time may be established based on the time that the amplitude of received electromagnetic radiation fell below the predetermined proximity threshold (e.g. the gesture end time may be said to occur a predetermined number of time units, such as samples, before the received electromagnetic radiation fell below the predetermined proximity threshold). An example in which the gesture end time is established on this basis is illustrated in FIG. 6.

Similarly, in some embodiments, the gesture end time may be established after a predetermined period of time has elapsed following the gesture start time. In some embodiments, the occurrence of a gesture start time triggers a timeout counter which monitors the time following the gesture start time to ensure that it does not exceed a predetermined timeout value. If the predetermined timeout value is reached before the received electromagnetic radiation falls below the predetermined proximity threshold, then the gesture end time may be established due to the timeout. If however, the received electromagnetic radiation falls below the predetermined proximity threshold before the timeout, then the gesture end time may be established based on the time when the amplitude fell below the threshold.

In at least some embodiments, the amplitude of received electromagnetic radiation at the gesture end time may be recorded along with the gesture end time. That is, these values may be stored in the memory 315 (FIG. 3).

The controller 303 may also, at 406, detect a peak amplitude event based on the amplitudes of received electromagnetic radiation monitored after a proximity event has occurred. More particularly, at 406, the electronic device 201 identifies an amplitude summit 506 (FIGS. 5 to 9) between the gesture start time 502 and the gesture end time 504. That is, the electronic device 201 identifies a maximum amplitude of received electromagnetic radiation between the gesture start time 502 and the gesture end time 504.

In at least some embodiments, the amplitude of received electromagnetic radiation at the amplitude summit may be recorded along with the time associated with the amplitude summit. That is, these values may be stored in the memory 315 (FIG. 3).

At 408, a first incline 512 (FIGS. 5 to 9) is determined. The first incline 512 represents the average rate of change of the amplitude of received electromagnetic radiation during a period preceding the peak amplitude event. The first incline is determined based on the gesture start time and the peak amplitude event. More particularly, the first incline may be determined based on the amplitude of received electromagnetic radiation at the gesture start time and the amplitude of received electromagnetic radiation at the amplitude summit (i.e. the difference between these values) and also based on the elapsed time between the gesture start time and the peak amplitude event.

For example, the first incline, I1, may be determined as:

$$I1 = \frac{Amp(P) - Amp(S)}{\Delta t1},$$

where Amp(P) is the amplitude of received electromagnetic radiation at the peak amplitude event, Amp(s) is the amplitude of received electromagnetic radiation at the gesture start time, $\Delta t1$ is a measure of the elapsed time between the gesture start time and the peak amplitude event.

Similarly, at 410, a second incline 514 (FIGS. 5 to 9) is determined. The second incline represents the average rate of change of the amplitude of received electromagnetic radiation during a period subsequent to the peak amplitude event. More particularly, the second incline may be determined based on the amplitude of received electromagnetic radiation at the amplitude summit and the amplitude of the received electromagnetic radiation at the gesture end time (i.e. the difference between these values) and also based on the elapsed time between the peak amplitude event and the gesture end time.

For example, the second incline, I2, may be determined as:

$$I2 = \frac{Amp(E) - Amp(P)}{\Delta t2},$$

where Amp(P) is the amplitude of received electromagnetic radiation at the peak amplitude event, Amp(E) is the amplitude of received electromagnetic radiation at the gesture end time, Δt2 is a measure of the elapsed time between the peak amplitude event and the gesture end time.

As noted in the discussion above, in at least some embodiments, the electronic device 201 may be equipped with multiple electromagnetic radiation transmitters 105a, 105b, 105c, 105d, establishing multiple channels of received electromagnetic radiation. In such embodiments, the steps of the method 400 described above may be performed on a per-channel basis. That is, the amplitudes of received electromagnetic radiation may not be intermingled for each channel.

Next, at 412, the electronic device 201 identifies a gesture by comparing the first incline and the second incline to one or more predetermined incline thresholds. Different thresholds may be associated with different gestures.

In order to facilitate understanding of the nature of these various thresholds and the method by which the thresholds may be used to differentiate between different types of gestures, reference will be made to example amplitude curves for various gestures illustrated in figures numbered 5 to 9. Each of these figures illustrates: the predetermined proximity threshold 510, the gesture start time 502, the amplitude summit 506, the gesture end time 504, the first incline 512, and the second incline 514. Each figure also includes four amplitude signals for four channels: a first channel 520, a second channel 526, a third channel 522, and a fourth channel 524.

Referring first to FIG. 5, an inward vertical gesture is illustrated, which is characterized by a relatively steep first incline 512 and a relatively flat second incline 514. Accordingly, the predetermined incline thresholds used to identify an inward vertical gesture may indicate a relatively steep first incline and a relatively flat second incline.

By way of further example, as illustrated in FIG. 6, an outward vertical gesture is characterized by a relatively flat first incline 512 and a relatively steep second incline 514. Accordingly, the predetermined incline thresholds used to identify an outward vertical gesture may indicate a relatively flat first incline and a relatively steep second incline.

As illustrated in FIG. 7, a hover gesture is characterized by a relatively flat first incline 512 and a relatively flat second incline 514. Thus, the predetermined incline thresholds used to identify a hover gesture may indicate a relatively flat first incline and a relatively flat second incline.

Figure 8:
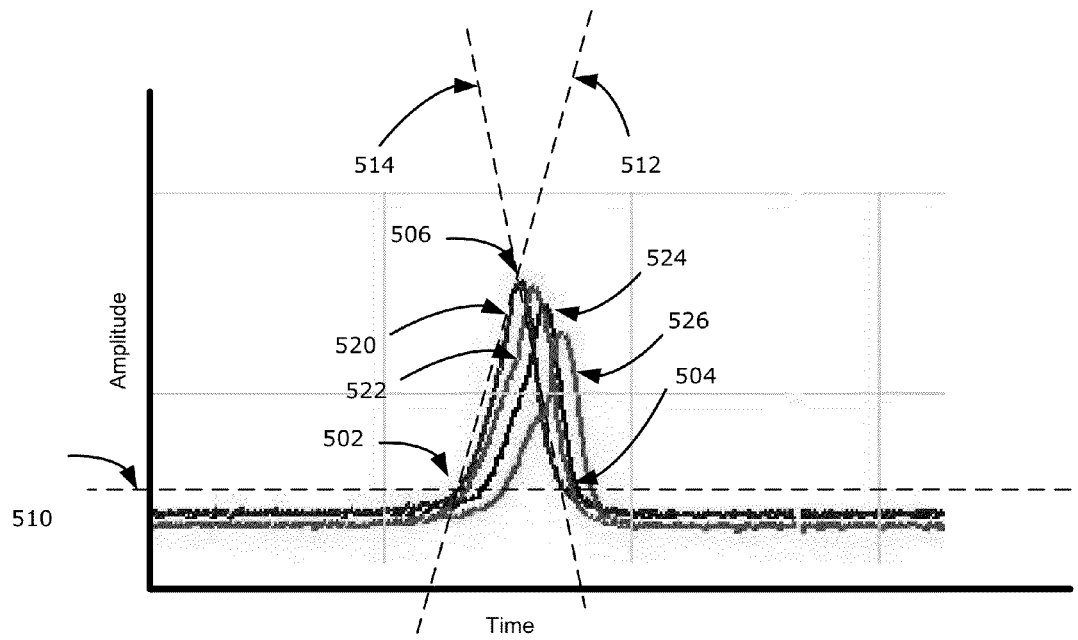
FIG. 8 is an example electromagnetic radiation receiver output for a downward swipe gesture in accordance with example embodiments of the present disclosure.
Figure 9:
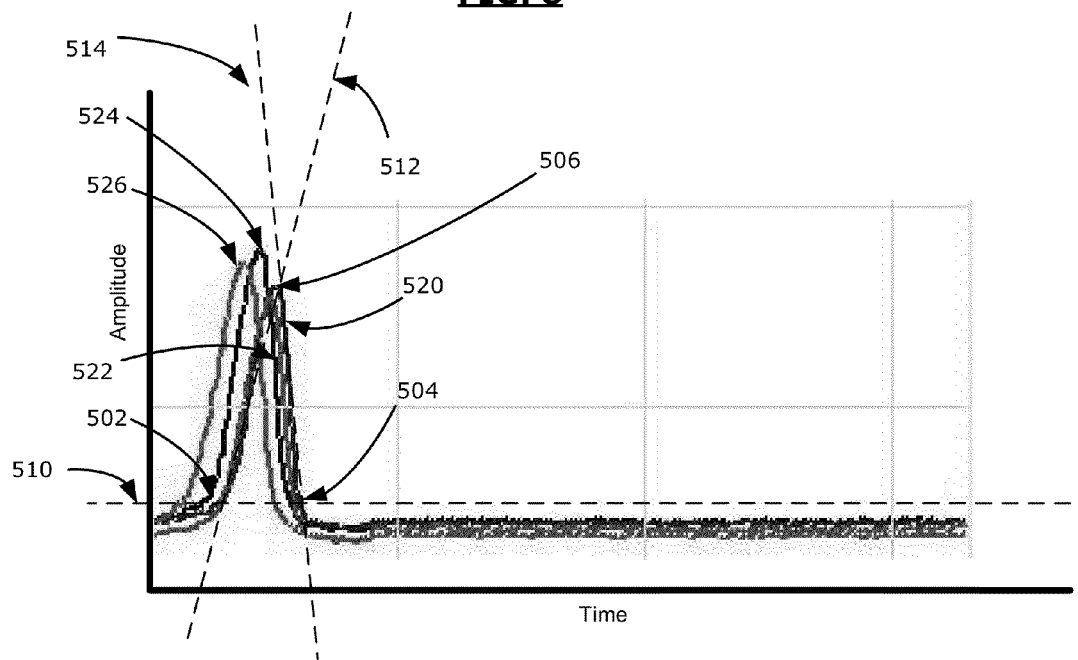
FIG. 9 is an example electromagnetic radiation receiver output for an upward swipe gesture in accordance with example embodiments of the present disclosure.

At illustrated in FIGS. 8 and 9, a swipe gesture is characterized by a relatively steep first incline 512 and a relatively steep second incline 514. Thus, the predetermined incline thresholds used to identify a hover gesture may indicate a relatively steep first incline and a relatively steep second incline.

Notably, each of the gesture types described above are characterized by an incline set having different characteristics than the incline set for the other gestures types. Thus, by evaluating the first incline and the second incline, a gesture type associated with a gesture may be determined. More particularly, in at least some embodiments, predetermined thresholds may be used to characterize the first incline and the second incline as flat or steep and the appropriate gesture identified based on the result.

As noted previously, in some embodiments, the electronic device 201 may include a plurality of electromagnetic radiation transmitters 105a, 105b, 105c, 105d associated with a plurality of channels. Each channel may be associated with a separate one of the electromagnetic radiation transmitters. In at least some such embodiments, a peak amplitude event may be detected (in the manner described above) for each of the channels and, if the identified gesture is a swipe gesture (which may be evaluated at 418), then the controller 303 may determine the direction of the swipe gesture at 420.

The direction may be determined based on the order of the peak amplitude events associated with the channels. For example, a downward swipe gesture is illustrated in FIG. 8.

In the downward swipe gesture, the order of the peak amplitude events for the channels is as follows: the first channel 520 (which is associated with a first electromagnetic radiation transmitter 105a located near the top side of the electronic device) realizes the peak amplitude event first, followed by either the third channel 522 (which is associated with the third electromagnetic radiation transmitter 105c located near the left side of the electronic device) or the fourth channel 524 (which is associated with the fourth electromagnetic radiation transmitter 105d located near the right side of the electronic device). Then, the second channel 526 (which is associated with a second electromagnetic radiation transmitter 105b located near the bottom side of the electronic device) realizes the peak amplitude event last. Based on this ordering, the controller 303 may determine that a downward swipe gesture has occurred. This ordering may be contrasted with the ordering of the upward swipe gesture illustrated in FIG. 9.

Referring briefly to FIG. 9, the order of the peak amplitude events for the channels is as follows: the second channel 526 (which is associated with a second electromagnetic radiation transmitter 105b located near the bottom side of the electronic device) realizes the peak amplitude event first, followed by either the fourth channel 524 (which is associated with the fourth electromagnetic radiation transmitter 105d located near the right side of the electronic device)or by the third channel 522 (which is associated with the third electromagnetic radiation transmitter 105c located near the left side of the electronic device). Then, the first channel 520 (which is associated with a first electromagnetic radiation transmitter 105a located near the top side of the electronic device) realizes the peak amplitude event last. Based on this ordering, the controller 303 may determine that an upward swipe gesture has occurred.

Thus, the ordering of the peak amplitude event (or, in some embodiments, the gesture start time), may allow the direction of a horizontal gesture to be determined by the controller 303. It will be appreciated that leftward or rightward swipe gestures may also be identified based on the ordering of features of the amplitude measurements.

Example Docking Station

As noted previously, the electronic device 201 that is configured to accept reflectance based gesture input may, in at least some embodiments, be a docking station. Referring now to FIG. 10, an example of one such embodiment will be discussed.

Figure 10:
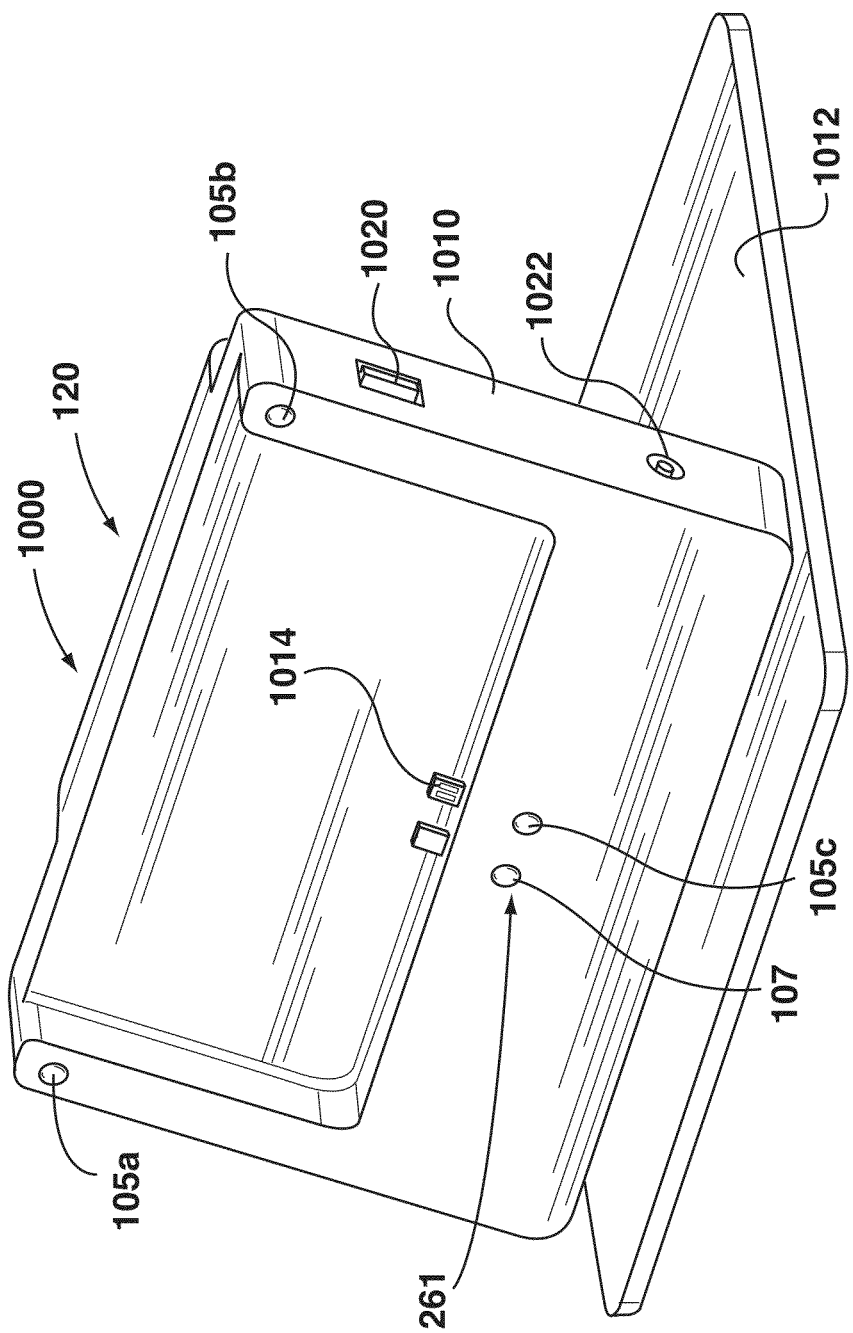
FIG. 10 is a perspective view of example docking station configured to receive contactless gestures in accordance with example embodiments of the present disclosure.

In FIG. 10, a perspective view of a peripheral device 120 that is a docking station 1000 is illustrated. As noted above, a docking station 1000 is a device that is configured to receive a host electronic device and to provide complementary functions to the host electronic device. The docking station 1000 may include one or more host electronic device connectors 1014 that allow the docking station to connect to a host electronic device (such as a tablet and/or smartphone). In the example illustrated, the host electronic device connectors 104 are included on an upper portion 1010 of the docking station 1000.

The docking station may also include one or more ports 1020, 1022 to allow the host electronic device to connect to an external components, such as an external power supply, a network, other peripheral devices such as a speaker, microphone, camera, an external display, etc. In at least some embodiments, the docking station may include a universal serial bus (USB) hub that allows various USB devices to be connected to the host electronic device via the docking station. In the example illustrated, two ports 1020, 1022 are displayed. A first port 1020 is a USB port that allows for connections with USB devices and a second port 1022 is a power connector that allows for connection with an external power supply. Other ports may be included instead of or in addition to the ports displayed in FIG. 10 in other embodiments.

The docking station 1000 includes a base 1012 which is configured to rest upon a flat surface, such as a table, to support the docking station 1000. In the example illustrated, the docking station 1000 also includes an upper portion 1010. The upper portion 1010 is rotatably connected to the base 1012 to allow the angle between the upper portion 1010 and the base 1012 to be varied, thereby varying the angle of a host electronic device relative to the table or other surface supporting the docking station 1000. In order to allow for such rotation, the upper portion 1010 may be connected to the base 1012 with a hinge (not shown). In the example illustrated, the upper portion 1010 is held in a position in which there is an angle of approximately eighty degrees between the base 1012 and the upper portion 1010.

In other embodiments (not shown), the docking station 1000 may not allow the angle between the host electronic device and the table (or other supporting surface) to be varied. Instead, the docking station 1000 may hold the host electronic device at a predetermined and fixed angle relative to the table (or other supporting surface).

The docking station 1000 also includes reflectance-based input components 261. The reflectance-based input components are described in greater detail above with reference to FIG. 1. As noted previously, the reflectance-based input components are configured to allow a user of the electronic device 201 to input one or more instructions, commands, or other input to a host electronic device. More particularly, the reflectance-based input components 261 may be configured to receive contactless input from a user of the electronic device 201.

In the embodiment of FIG. 10, the reflectance-based input components 261 include one or more electromagnetic radiation transmitters 105a, 105b, 105c and one or more electromagnetic radiation receivers 107, which may be of the type described with reference to FIG. 1.

In the example illustrated, the reflectance-based input components 261 include three electromagnetic radiation transmitters 105a, 105b, 105c. The electromagnetic radiation transmitters 105a, 105b, 105c are mounted in spaced relation to one another so that each electromagnetic radiation transmitter 105a, 105b, 105c emits electromagnetic radiation (in the form of light) at a different region of the electronic device 201. In the example illustrated, the electromagnetic radiation transmitters 105a, 105b, 105c are arranged in a triangular shape; however, other shapes are also possible and contemplated.

In embodiments such as that described in FIG. 10, by including the reflectance-based input components 261 on a docking station 1000 rather than the host electronic device itself, the firing angle of the electromagnetic radiation transmitter(s) 105a, 105b, 105c may be optimized. That is, the firing angle of the electromagnetic radiation transmitter(s) 105a, 105b, 105c may optimized so that the electromagnetic radiation transmitter(s) 105a, 105b, 105c fire in the direction of a user rather than in another direction (e.g. the ceiling). In at least some embodiments, the electromagnetic radiation transmitter(s) 105a, 105b, 105c may be mounted on the docking station 1000 to allow the firing angle of the electromagnetic radiation transmitter(s) 105a, 105b, 105c to be varied. For example, the electromagnetic radiation transmitter(s) 105a, 105b, 105c may be rotatably connected to the docking station 1000 via a drive. The drive may be activated to rotate the electromagnetic radiation transmitter(s) 105a, 105b, 105c based on the amount of tilt associated with the docking station. For example, when a large amount of tilt is applied to the docking station (i.e. when the host electronic device is pointed more upwardly, at the ceiling), the firing angle of the electromagnetic radiation transmitter(s) 105a, 105b, 105c may be adjusted to compensate (i.e. the electromagnetic radiation transmitter(s) 105a, 105b, 105c may be pointed more downward). The amount of tilt may, in at least some embodiments, be determined based on a signal from an orientation sensor associated with the docking station and/or the host electronic device.

While the present application is primarily described in terms of methods, a person of ordinary skill in the art will understand that the present application is also directed to various apparatus such as a peripheral device, a handheld electronic device, or an electronic device of another type. The present disclosure has generally described a peripheral device 120 that is configured for contactless gesture recognition. However, it will be appreciated that the methods and components described herein could be included in other types of electronic devices. For example, in some embodiments, the electronic device 201 may not be a peripheral device 120. Instead, the electronic device 201 may be a device having capabilities similar to the example host electronic devices discussed above. For example, the electronic device 201 may be a smartphone, tablet computer, laptop or desktop computer, television, game console, navigation system, etc.

Furthermore, in some embodiments, a computer readable medium may be configured to perform one or more of the methods described herein.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method of detecting a contactless gesture on an electronic device, the electronic device having an electromagnetic radiation transmitter and an electromagnetic radiation receiver, the electromagnetic radiation receiver configured for receiving electromagnetic radiation emitted from the electromagnetic radiation transmitter and reflected by an object, the method comprising:
    monitoring an amplitude of received electromagnetic radiation at the electromagnetic radiation receiver;
    detecting a proximity event by comparing the amplitude to a proximity threshold;
    after detecting the proximity event, continuing to monitor the amplitude of the received electromagnetic radiation at the electromagnetic radiation receiver; and,
    in response to detecting the proximity event, performing an analysis on the received electromagnetic radiation indicates a first gesture comprises:
        detecting a peak amplitude event based on the amplitudes of the received electromagnetic radiation monitored after the proximity event;
        determining a measure of the rate of change of the amplitude or received electromagnetic radiation before the peak amplitude event;
        determining a measure of the rate of change amplitude of received electromagnetic radiation after the peak amplitude event; and
        determining whether the received electromagnetic radiation indicates the first gesture based on the measure of the rate of change of the amplitude of received electromagnetic radiation before the peak amplitude event and the measure of the rate of change of the amplitude of received electromagnetic radiation after the peak amplitude event.

2. The method of claim 1, wherein determining a measure of the rate of change of the amplitude of received electromagnetic radiation before the peak amplitude event comprises determining a first incline representing an average rate of change of the amplitude of received electromagnetic radiation during a period preceding the peak amplitude event;
    and wherein determining a measure of the rate of change of the amplitude of received electromagnetic radiation after the peak amplitude event comprises determining a second incline representing an average rate of change of the amplitude of received electromagnetic radiation during a period subsequent to the peak amplitude event; and
    wherein determining whether the received electromagnetic radiation indicates the first gesture based on the measure of the rate of change of the amplitude of received electromagnetic radiation before the peak amplitude event and the measure of the rate of change amplitude of received electromagnetic radiation after the peak amplitude event comprises comparing the first incline and the second incline to one or more incline thresholds.

3. The method of claim 2, further comprising, prior to detecting the peak amplitude event:
    detecting a gesture start time based on the amplitudes of the received electromagnetic radiation by evaluating a series of received amplitudes according to one or more rules,
    and wherein the first incline is determined based on the gesture start time and the peak amplitude event.

4. The method of claim 3, wherein one of the rules specifies that the gesture start time occurs when the proximity event is detected.

5. The method of claim 3, wherein detecting a gesture start time comprises:
    while the amplitude of received electromagnetic radiation remains above the proximity threshold, detecting a period of relatively stable received electromagnetic radiation; and
    if the period exceeds a time threshold, determining that a gesture start time has occurred.

6. The method of claim 3, further comprising:
    detecting a gesture end time when the amplitude of the received electromagnetic radiation falls below the proximity threshold,
    and wherein the second incline is determined based on the gesture end time and the peak amplitude event.

7. The method of claim 6, further comprising: detecting the gesture end time after a period of time has elapsed following the gesture start time.

8. The method of claim 6, wherein detecting the peak amplitude event comprises:
    identifying a maximum amplitude of received electromagnetic radiation between the gesture start time and the gesture end time.

9. The method of claim 2, wherein the first gesture is an inward vertical gesture and wherein the one or more incline thresholds used to identify the inward vertical gesture indicate a relatively steep first incline and a relatively flat second incline.

10. The method of claim 2, wherein the first gesture is an outward vertical gesture and wherein the one or more incline thresholds used to identify the outward vertical gesture indicate a relatively flat first incline and a relatively steep second incline.

11. The method of claim 2, wherein the first gesture is a hover gesture and wherein the one or more incline thresholds used to identify the hover gesture indicate a relatively flat first incline and a relatively flat second incline.

12. The method of claim 2, wherein the first gesture is a horizontal gesture and wherein the one or more incline thresholds used to identify the horizontal gesture indicate a relatively steep first incline and a relatively steep second incline.

13. The method of claim 12, wherein the electronic device includes a plurality of electromagnetic radiation transmitters and wherein the received electromagnetic radiation is associated with a plurality of channels, each channel associated with a separate one of the plurality of electromagnetic radiation transmitters, and wherein detecting a peak amplitude event based on the amplitudes of the received electromagnetic radiation monitored after the proximity event comprises detecting a peak amplitude event associated with each of the channels, the method further comprising:
    determining a direction associated with the horizontal gesture based on the order of the peak amplitude events associated with the channels.

14. The method of claim 1, wherein the electronic device is a peripheral device associated with a host electronic device, the method further comprising:

when the analysis on the received electromagnetic radiation indicates the first gesture, outputting a code to the host electronic device that is unique to the first gesture.

15. An electromagnetic device comprising:

one or more electromagnetic radiation transmitters;

an electromagnetic radiation receiver, the electromagnetic radiation receiver configured for receiving electromagnetic radiation emitted from the one or more electromagnetic radiation transmitters and reflected by an object; and a controller coupled to the one or more electromagnetic radiation transmitters and the electromagnetic radiation receiver, the controller configured to:

monitor an amplitude of received electromagnetic radiation at the electromagnetic radiation receiver;

detect a proximity event by comparing the amplitude to a proximity threshold;

after detecting the proximity event, continue to monitor the amplitude of the received electromagnetic radiation at the electromagnetic radiation receiver; and in response to detecting the proximity event, perform an analysis on the received electromagnetic radiation to determine whether the received electromagnetic radiation indicates a first gesture, wherein performing an analysis on the received electromagnetic radiation to determine whether the received electromagnetic radiation indicates a first gesture comprises:

detecting a peak amplitude event based on the amplitudes of the received electromagnetic radiation monitored after the proximity event;

determining a measure of the rate of change of the amplitude of received electromagnetic radiation before the peak amplitude event;

determining a measure of the rate of change amplitude of received electromagnetic radiation after the peak amplitude event; and determining whether the received electromagnetic radiation indicates the first gesture based on the measure of the rate of change of the amplitude of received electromagnetic radiation before the peak amplitude event and the measure of the rate of change amplitude of received electromagnetic radiation after the peak amplitude event.

16. The electronic device of claim 15, wherein determining a measure of the rate of change of the amplitudes of received electromagnetic radiation before the peak amplitude event comprises determining a first incline representing an average rate of change of the amplitude of received electromagnetic radiation during a period preceding the peak amplitude event;

and wherein determining a measure of the rate of change of the amplitude of received electromagnetic radiation after the peak amplitude event comprises determining a second incline representing an average rate of change of the amplitude of received electromagnetic radiation during a period subsequent to the peak amplitude event; and wherein determining whether the received electromagnetic radiation indicates the first gesture based on the measure of the rate of change of the amplitude of received electromagnetic radiation before the peak amplitude event and the measure of the rate of change amplitudes of received electromagnetic radiation after the peak amplitude event comprises comparing the first incline and the second incline to one or more incline thresholds.

17. The electronic device of claim 16, wherein the one or more electromagnetic radiation transmitters comprises:

a plurality of electromagnetic radiation transmitters, and wherein the received electromagnetic radiation is associated with a plurality of channels, each channel associated with a separate one of the plurality of electromagnetic radiation transmitters, and wherein detecting a peak amplitude event based on the amplitudes of the received electromagnetic radiation monitored after the proximity event comprises detecting a peak amplitude event associated with each of the channels, and wherein the controller is further configured to: determine a direction associated with a horizontal gesture based on the order of the peak amplitude events associated with the channels.

18. A non-transitory computer readable storage medium comprising computer-executable instructions for detecting a contactless gesture on an electronic device, the electronic device having an electromagnetic radiation transmitter and an electromagnetic radiation receiver, the electromagnetic radiation receiver configured for receiving electromagnetic radiation emitted from the electromagnetic radiation transmitter and reflected by an object, the computer executable instructions including:

instructions for monitoring an amplitude of received electromagnetic radiation at the electromagnetic radiation receiver;

instructions for detecting a proximity event by comparing the amplitude to a proximity threshold;

instructions for after detecting the proximity event, continuing to monitor the amplitude of the received electromagnetic radiation at the electromagnetic radiation receiver; and, instructions for in response to detecting the proximity event, performing an analysis on the received electromagnetic radiation to determine whether the received electromagnetic radiation indicates a first gesture, wherein performing an analysis on the received electromagnetic radiation to determine whether the received electromagnetic radiation indicates a first gesture comprises:

detecting a peak amplitude event based on the amplitudes of the received electromagnetic radiation monitored after the proximity event;

determining a measure of the rate of change amplitude of received electromagnetic radiation before the peak amplitude event;

determining a measure of the rate of change of the amplitude of received electromagnetic radiation after the peak amplitude event; and determining whether the received electromagnetic radiation indicates the first gesture based on the measure of the rate of change of the amplitude of received electromagnetic radiation before the peak amplitude event and the measure of the rate of change of the amplitude of received electromagnetic radiation after the peak amplitude event.

19. The non-transitory computer readable storage medium of claim 18, wherein determining a measure of the rate of change of the amplitude of received electromagnetic radiation before the peak amplitude event comprises determining a first incline representing an average rate of change of the amplitude of received electromagnetic radiation during a period preceding the peak amplitude event;

and wherein determining a measure of the rate of change of the amplitude of received electromagnetic radiation after the peak amplitude event comprises determining a second incline representing an average rate of change of the amplitude of received electromagnetic radiation during a period subsequent to the peak amplitude event; and wherein determining whether the received electromagnetic radiation indicates the first gesture based on the measure of the rate of change of the amplitude of received electromagnetic radiation before the peak amplitude event and the measure of the rate of change amplitude of received electromagnetic radiation after the peak amplitude event comprises comparing the first incline and the second incline to one or more incline thresholds.

20. The non-transitory computer readable storage medium of claim 19, further comprising instructions for, prior to detecting the peak amplitude event:

detecting a gesture start time based on the amplitudes of the received electromagnetic radiation by evaluating a series of received amplitudes according to one or more rules, and wherein the first incline is determined based on the gesture start time and the peak amplitude event.

* * * * *